US00RE43754E

(19) United States
(12) Reissued Patent
Andersen

(10) Patent Number: US RE43,754 E
(45) Date of Reissued Patent: Oct. 23, 2012

(54) SOFA

(75) Inventor: Per Weiss Andersen, Randers (DK)

(73) Assignee: Innovation U.S.A., Inc., South San Francisco, CA (US)

(21) Appl. No.: 29/382,271

(22) Filed: Dec. 30, 2010

Related U.S. Patent Documents

Reissue of:
(64) Patent No.: Des. 583,585
Issued: Dec. 30, 2008
Appl. No.: 29/283,569
Filed: Aug. 17, 2007

(51) LOC (9) Cl. ..... 06-01
(52) U.S. Cl. ..... D6/381
(58) Field of Classification Search ..... D6/334–338, D6/349, 355, 361, 368–370, 376, 379–381, D6/492, 500–502; 297/16.1, 42, 94, 135, 297/175, 232, 233, 350, 351, 445.1, 448.1, 297/448.2, 451.9; 5/12.1, 12.2
See application file for complete search history.

(56) References Cited

U.S. PATENT DOCUMENTS

| | | | | | |
|---|---|---|---|---|---|
| 2,217,426 | A | | 10/1940 | Zareko | |
| D151,587 | S | * | 11/1948 | Buckner | D6/381 |
| D169,911 | S | * | 6/1953 | Netzer | D6/381 |
| D170,665 | S | * | 10/1953 | Spence | D6/381 |
| D263,770 | S | | 4/1982 | Melchior | |
| 4,621,381 | A | | 11/1986 | Schramek | |
| 5,329,654 | A | | 7/1994 | Sherman | |
| D425,711 | S | | 5/2000 | Desombre | |
| D429,082 | S | | 8/2000 | Desombre | |
| 6,161,231 | A | | 12/2000 | Kraft et al. | |

(Continued)

*Primary Examiner* — Sandra Snapp
(74) *Attorney, Agent, or Firm* — Miles & Stockbridge P.C.

(57) CLAIM

The ornamental design for a sofa, as shown and disclosed.

DESCRIPTION

FIG. 1 is a perspective view of *a first embodiment of* the sofa showing the new design;
FIG. 2 is a front view thereof;
FIG. 3 is a left side view thereof;
FIG. 4 is a right side view thereof;
FIG. 5 is a top plan view thereof;
FIG. 6 is a bottom plan view thereof;
FIG. 7 is a back view thereof;
FIG. 8 is a perspective view thereof in a partially reclined position;
FIG. 9 is a perspective view thereof in a fully reclined position; [and,]
FIG. 10 is a perspective view thereof with part of the back in a partially reclined position[.]*;*
*FIG. 11 is a perspective view of a second embodiment of the sofa showing the new design;*
*FIG. 12 is a front view thereof;*
*FIG. 13 is a left side view thereof;*
*FIG. 14 is a right side view thereof;*
*FIG. 15 is a top plan view thereof;*
*FIG. 16 is a bottom plan view thereof;*
*FIG. 17 is a back view thereof;*
*FIG. 18 is a perspective view thereof in a partially reclined position;*
*FIG. 19 is a perspective view thereof in a fully reclined position; and,*
*FIG. 20 is a perspective view thereof with part of the back in a partially reclined position.*
*The dashed lines shown in the drawings are for illustrative purposes only and form no part of the claimed design.*

1 Claim, 11 Drawing Sheets

Figure 1:
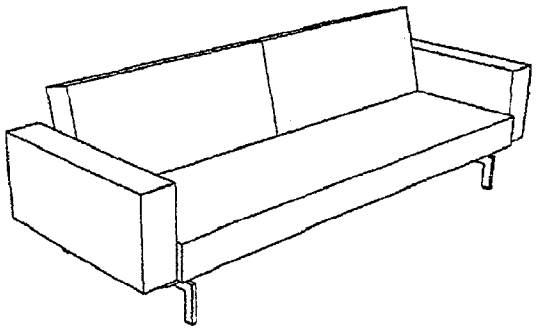
Figure 10:
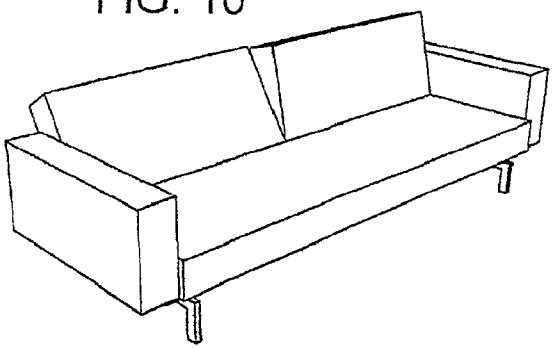
Figure 9:
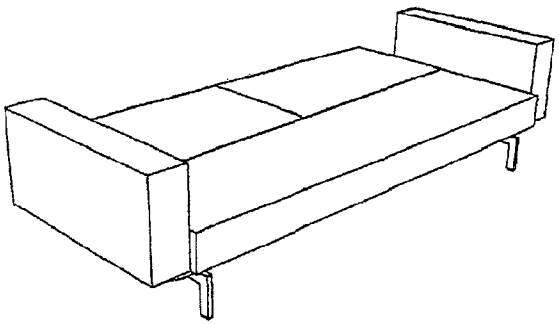
Figure 8:
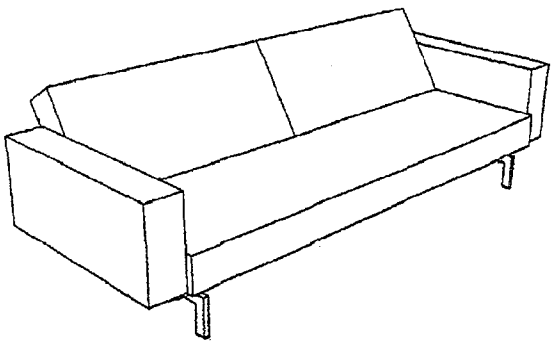
Figure 4:
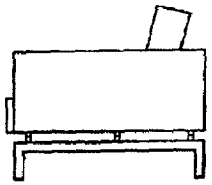
Figure 3:
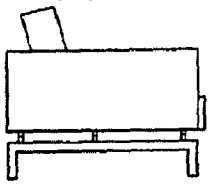
Figure 7:
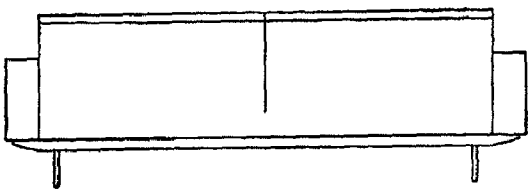
Figure 6:
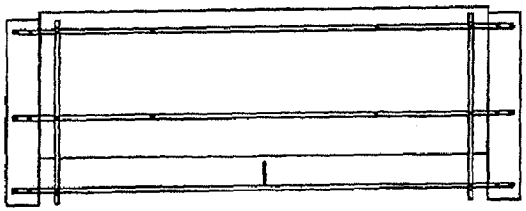
Figure 2:
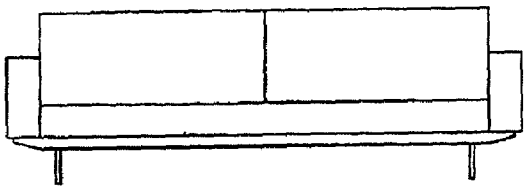
Figure 5:
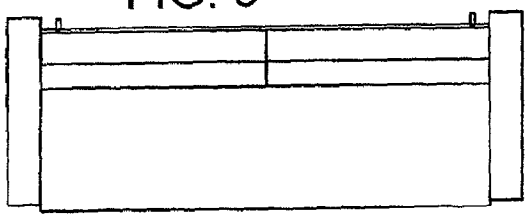

Matter enclosed in heavy brackets [ ] appears in the original patent but forms no part of this reissue; matter printed in italics indicates the additions made by reissue.

(New)

U.S. PATENT DOCUMENTS

D444,305 S * 7/2001 Mourgue ..... D6/335
D446,962 S * 8/2001 Mourgue ..... D6/381
D455,281 S * 4/2002 Andersen et al. ..... D6/381
D455,282 S * 4/2002 Andersen et al. ..... D6/381
D477,152 S 7/2003 Levy
D484,327 S 12/2003 Ricci
D490,996 S * 6/2004 Weiss et al. ..... D6/381
D493,039 S 7/2004 Ricci
D495,514 S 9/2004 Ricci
D495,892 S 9/2004 Ricci
D495,893 S 9/2004 Ricci
D498,075 S * 11/2004 Mourgue ..... D6/381
6,824,220 B1 11/2004 Davison
D499,261 S 12/2004 Ricci
D515,333 S 2/2006 Natuzzi
D515,334 S 2/2006 Natuzzi
D527,541 S 9/2006 Natuzzi
D541,074 S 4/2007 Natuzzi
D546,575 S 7/2007 Nastri
D569,111 S 5/2008 Swanson
D569,123 S 5/2008 Rooz et al.
D603,617 S * 11/2009 Weiss ..... D6/381
D603,618 S * 11/2009 Weiss ..... D6/381
D603,619 S * 11/2009 Weiss ..... D6/381
D604,957 S * 12/2009 Weiss ..... D6/381
D610,366 S * 2/2010 Kanthasamy ..... D6/381
D614,419 S * 4/2010 Andersen ..... D6/381
D615,766 S * 5/2010 Andersen ..... D6/381
D616,215 S * 5/2010 Andersen ..... D6/381
D617,571 S * 6/2010 Andersen ..... D6/381
D618,007 S * 6/2010 Andersen ..... D6/381
D621,174 S * 8/2010 Kanthasamy ..... D6/381
D623,869 S * 9/2010 Andersen ..... D6/381

* cited by examiner

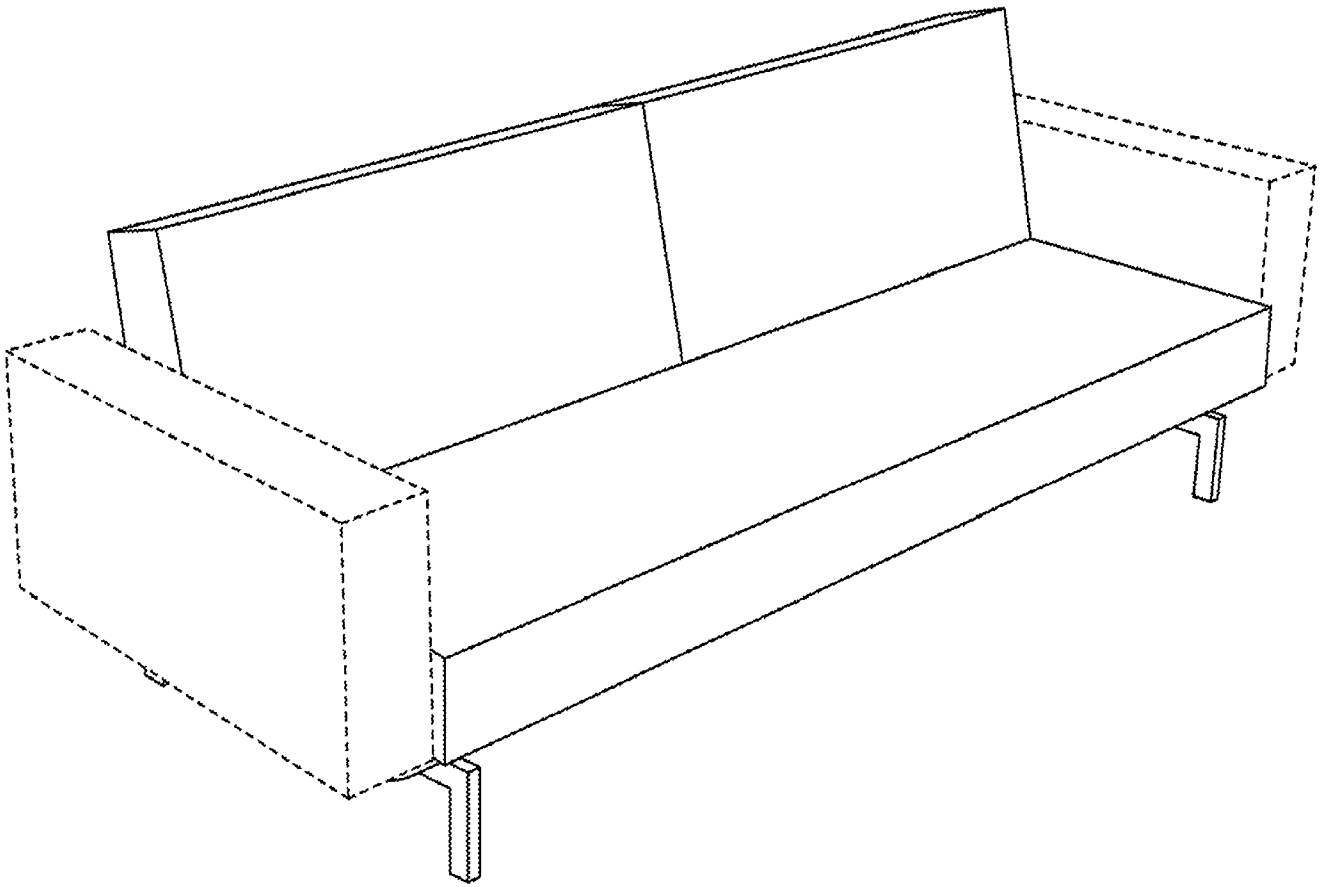
FIG. 11 (New)

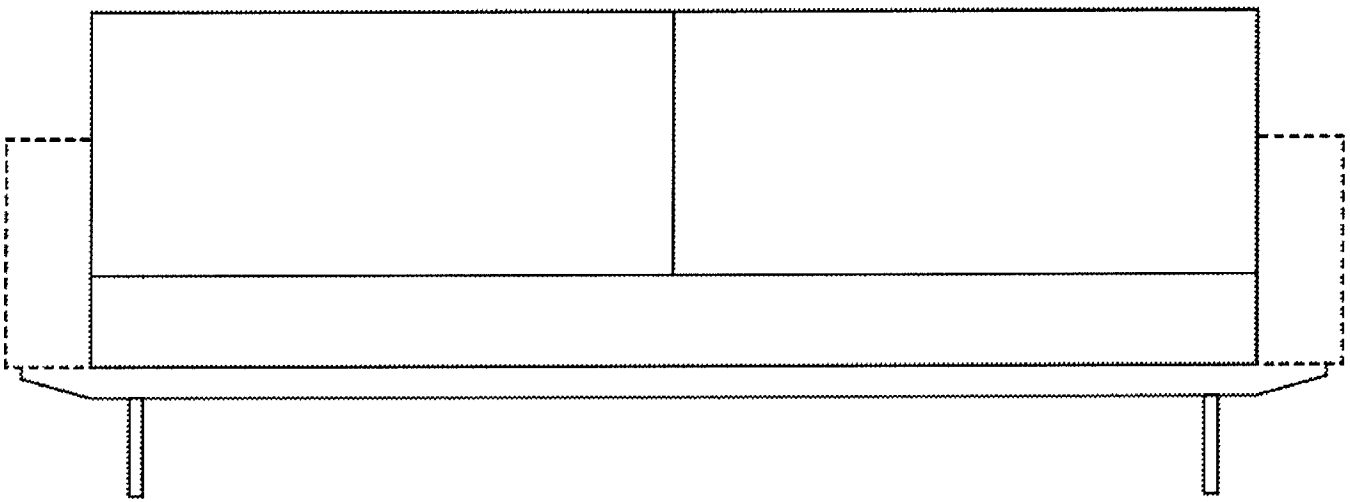
FIG. 12 (New)

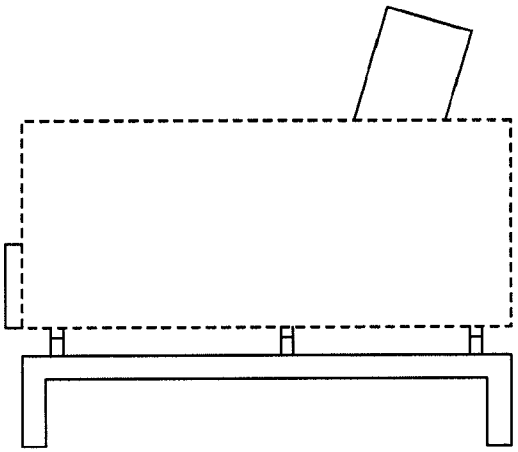
FIG. 14 (New)
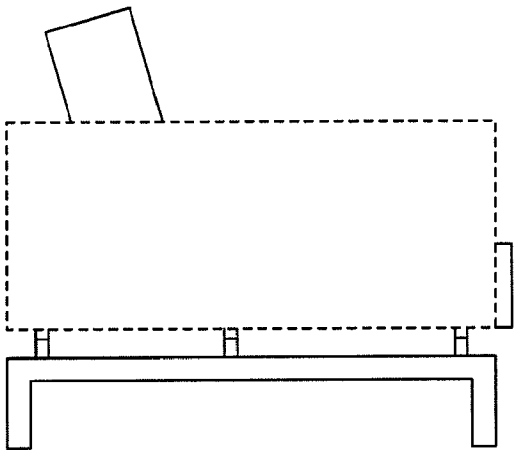
FIG. 13 (New)

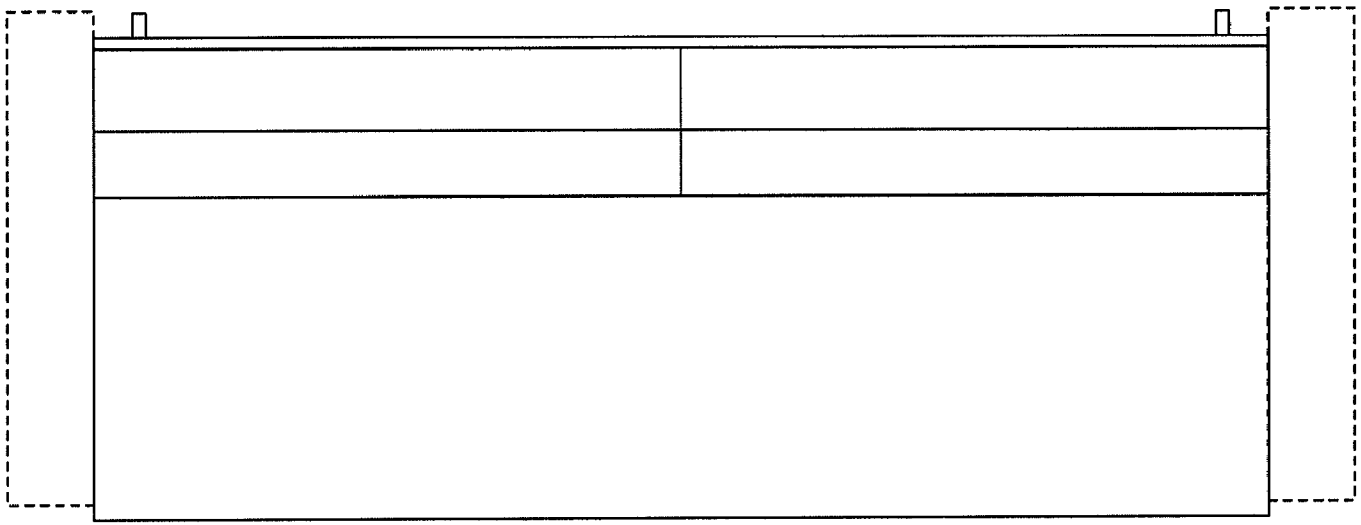
FIG. 15 (New)

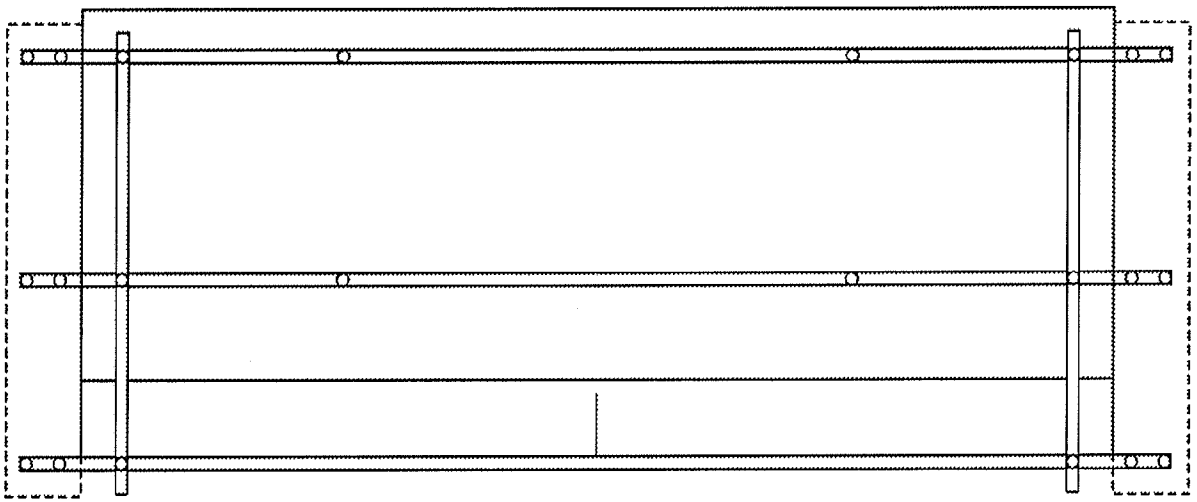
FIG. 16 (New)

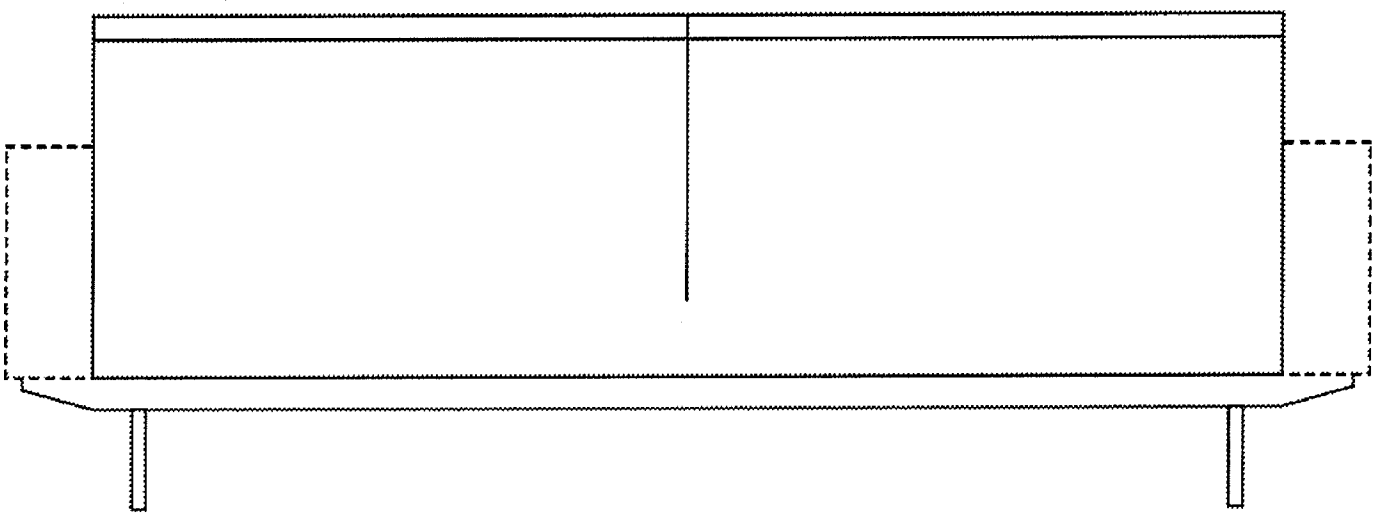
FIG. 17 (New)

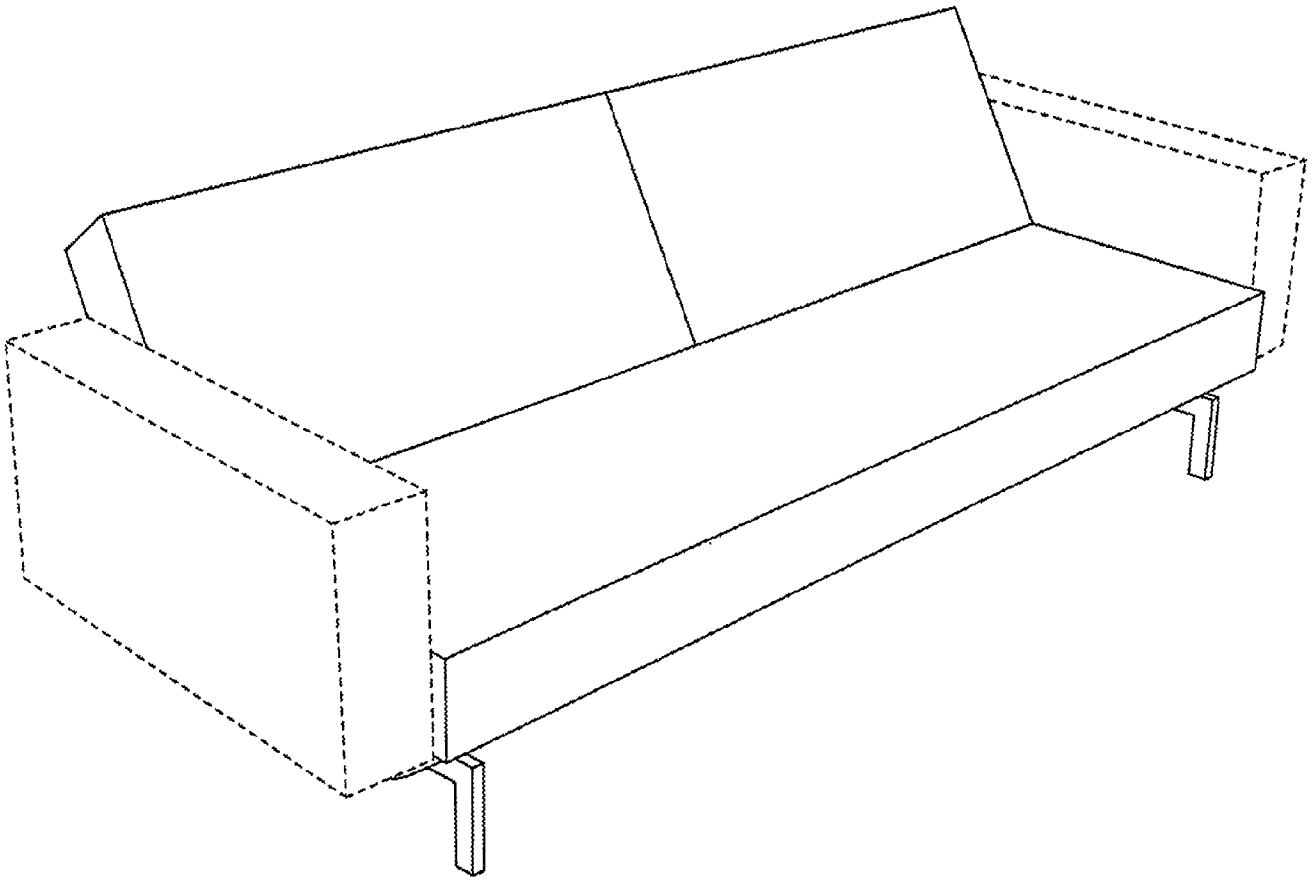
FIG. 18 (New)

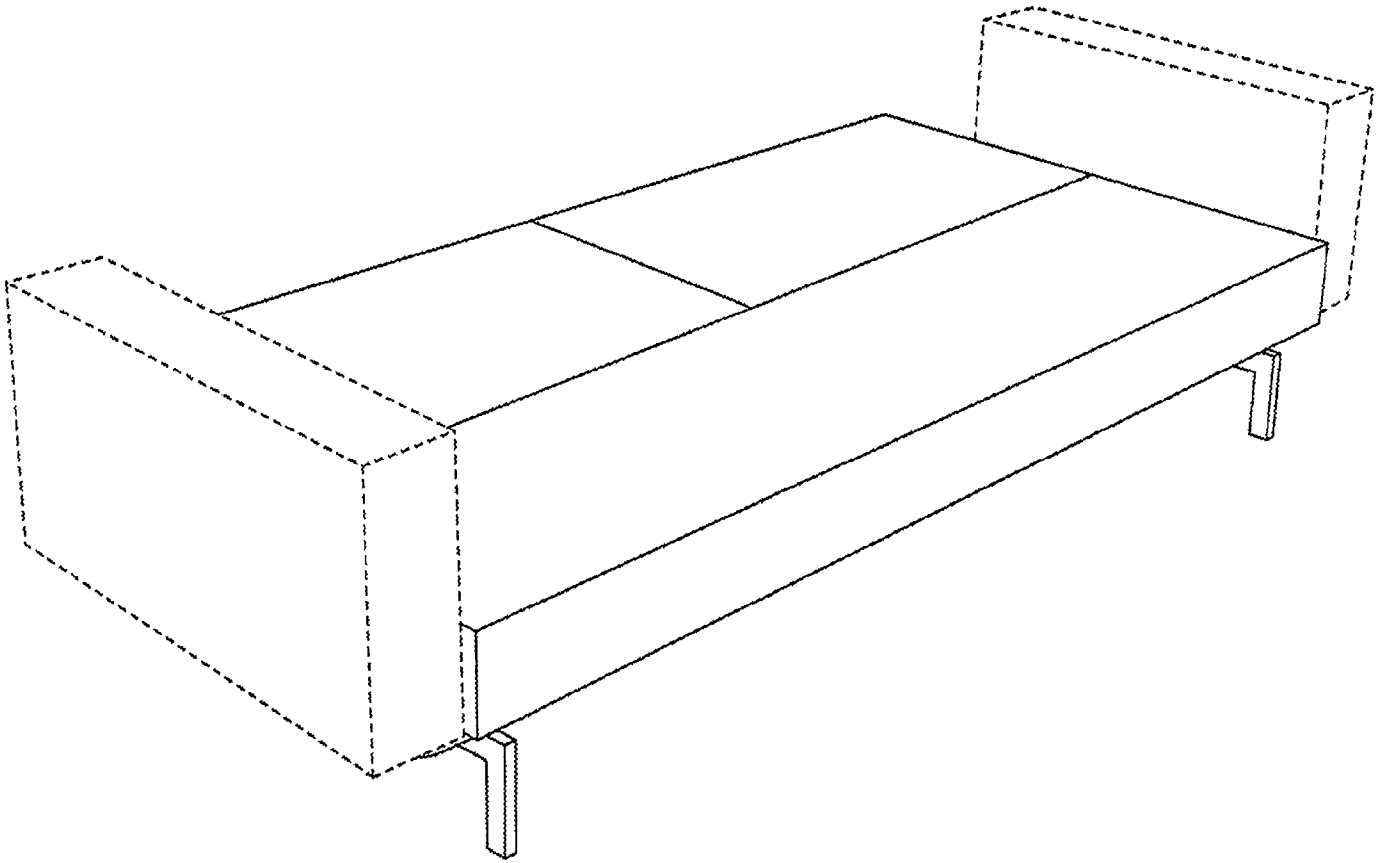
FIG. 19 (New)

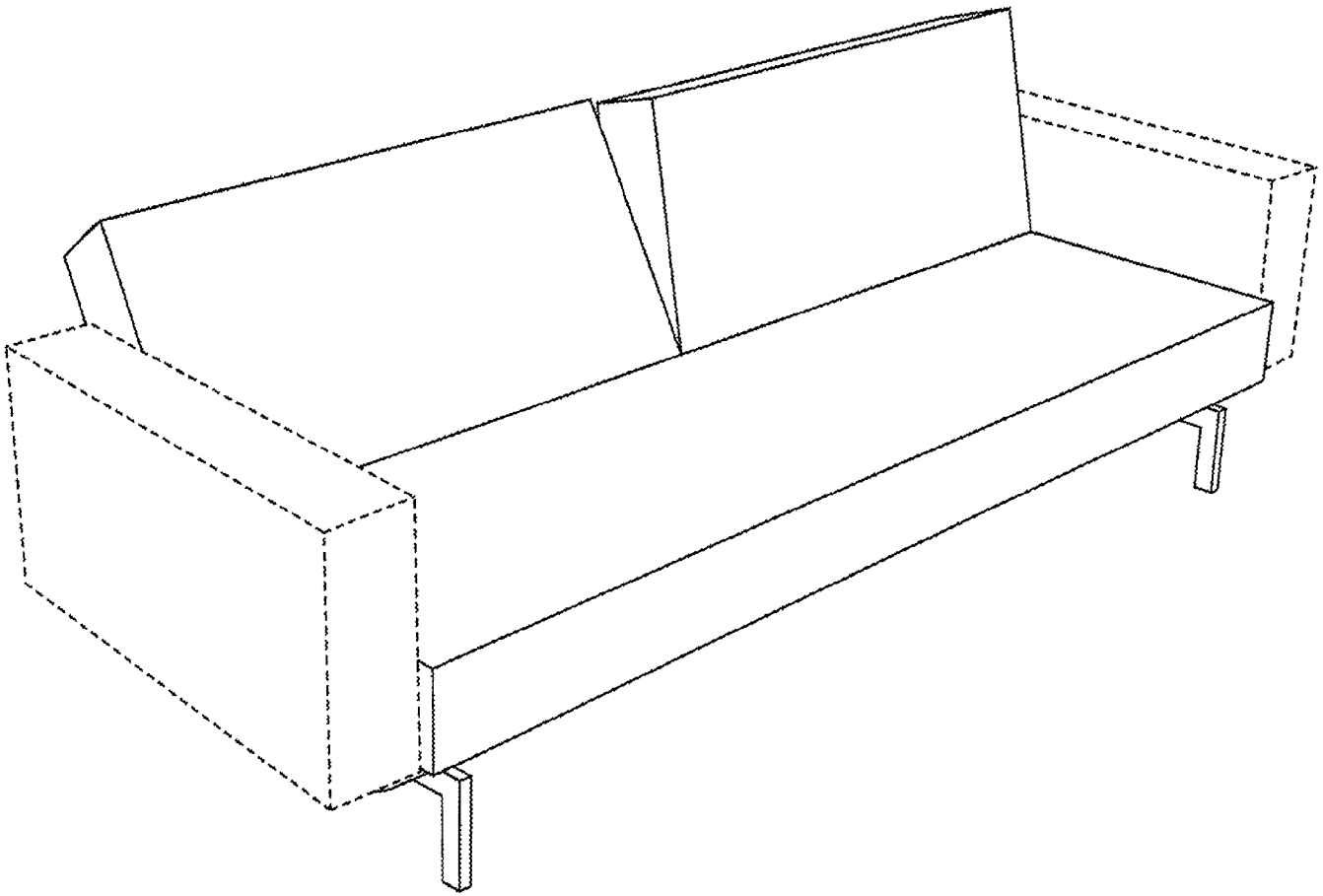
FIG. 20 (New)